United States Patent [19]

Wooderson

[11] 4,292,932
[45] Oct. 6, 1981

[54] VEHICULAR PET ANCHOR

[76] Inventor: Charles R. Wooderson, 5572 Baronridge, #5, Mehlville, Mo. 63129

[21] Appl. No.: 103,060

[22] Filed: Dec. 13, 1979

[51] Int. Cl.³ .............................................. A01K 27/00
[52] U.S. Cl. ..................................... 119/109; 280/801
[58] Field of Search .............. 119/109, 106, 118, 120; 280/801; 40/591

[56] References Cited

U.S. PATENT DOCUMENTS

| | | | |
|---|---|---|---|
| 2,665,143 | 1/1954 | Rasmussen | 280/801 |
| 2,909,154 | 10/1959 | Thomas | 119/109 |
| 3,603,295 | 9/1971 | Shuman | 119/109 |
| 3,946,509 | 3/1976 | McCaffrey | 40/591 |
| 4,004,583 | 1/1977 | Johnson | 280/801 |

*Primary Examiner*—Jay N. Eskovitz
*Attorney, Agent, or Firm*—Jack C. Munro

[57] ABSTRACT

A portable pet tether which is adapted to be located between a door and a door jam and in particular between the door and door jam of an automobile. The tether takes the form of an elongated strap which is to be constructed of a flexible thin material, such as leather, plastic, or rubber. The outer end of the strap is to be enlarged so as to prevent disassociation from the strap from the area of the door jam when the door is closed. A leash, or other similar type of attaching means, is to be secured to an attaching opening formed at the inner end of the strap.

4 Claims, 5 Drawing Figures

U.S. Patent    Oct. 6, 1981    4,292,932
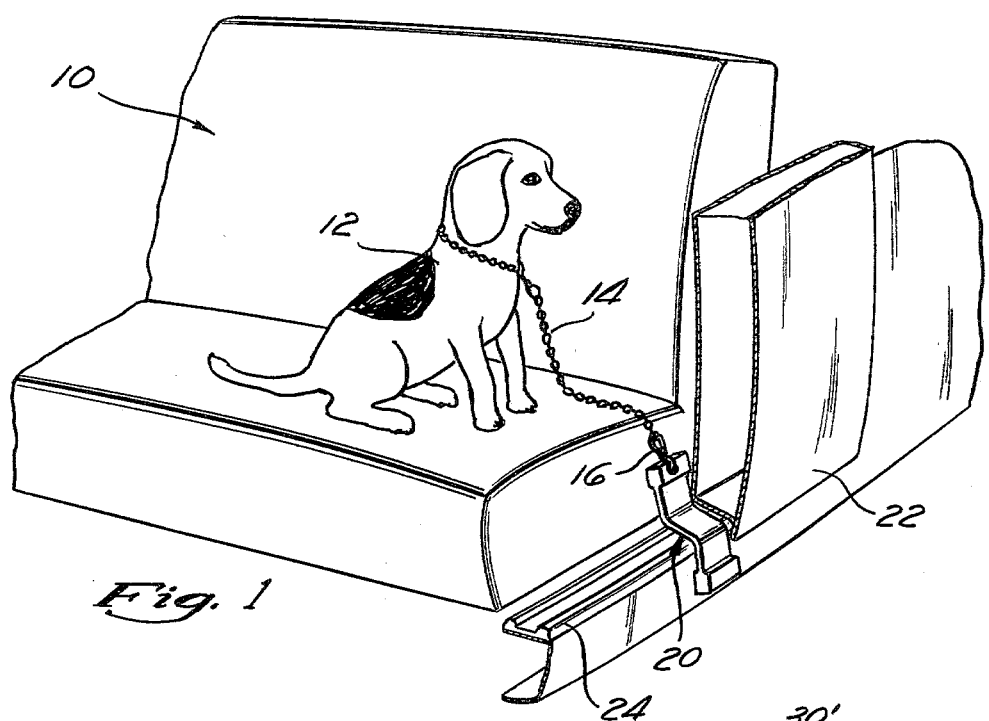
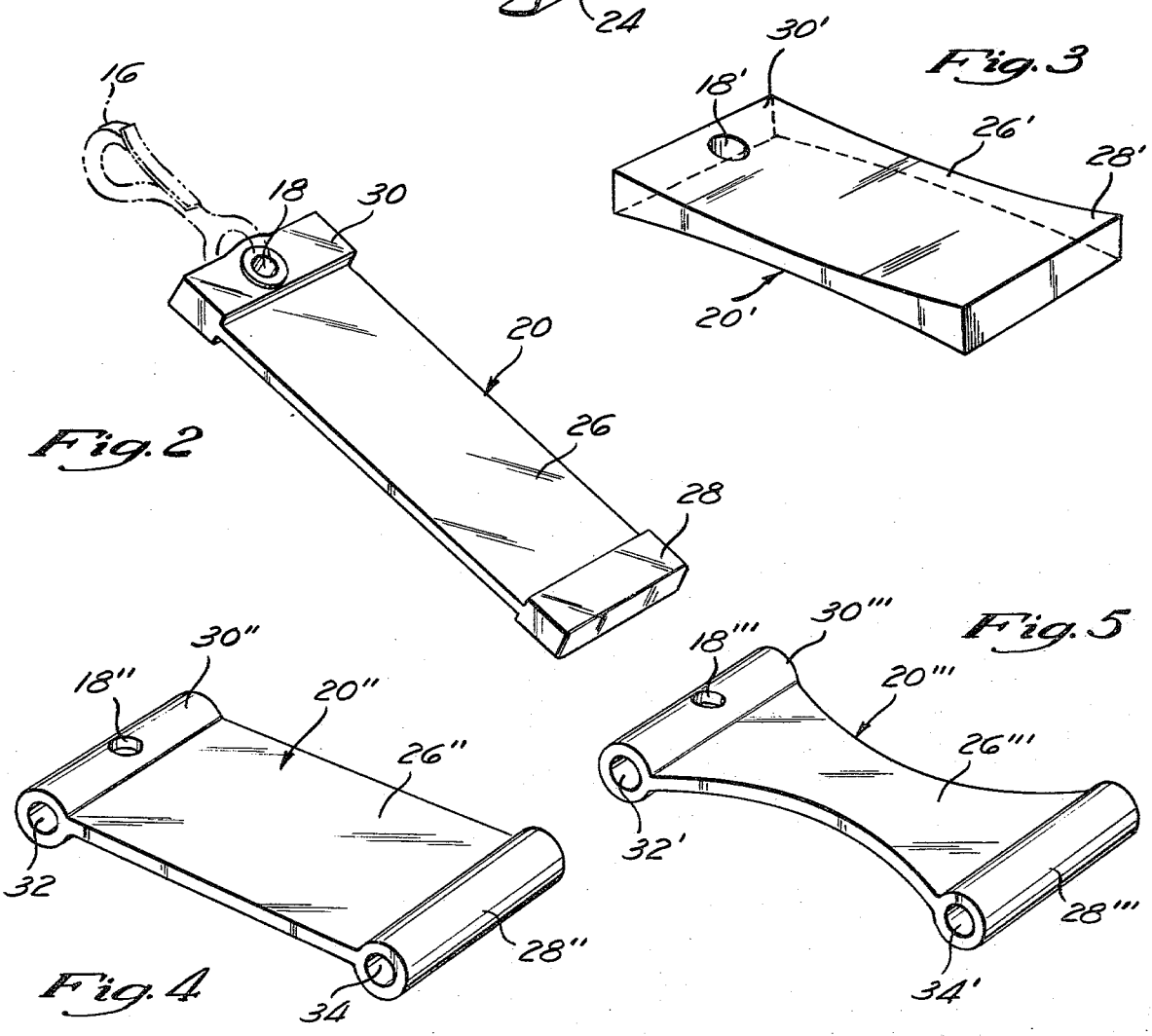
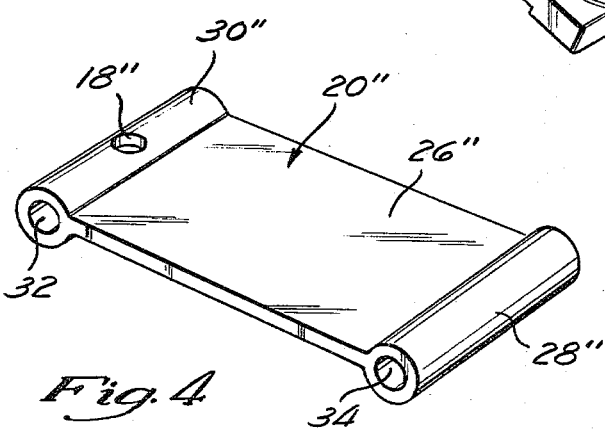
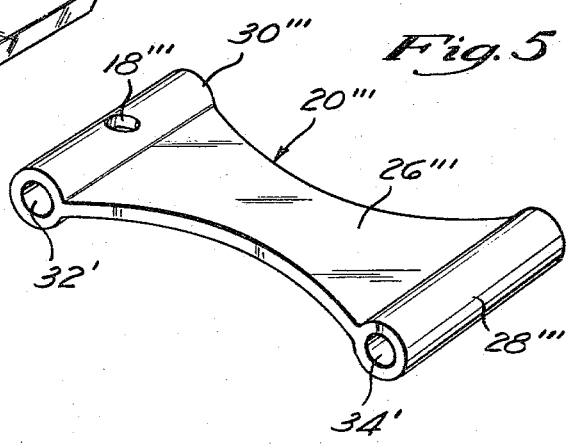

VEHICULAR PET ANCHOR

BACKGROUND OF THE INVENTION

The field of this invention relates to a device to restrict an animal's movements to a particular confined area, and primarily to a portable device which is to be connectable to a vehicle, such as an automobile, and then connectable to the pet to confine the pet to a specific area.

People frequently take animals with them in vehicles, such as in a truck or automobile. At times, a particularly rambuctious animal, such as a dog or cat, can be distractive to the driver and will become a hazard to the operation of the vehicle. Also at times when the vehicle is left unattended, it may be desirable to locate the pet in a particular location within the vehicle so as to prevent the pet from disturbing articles carried within the vehicle. Also, at times, it would be desirable if during traveling the pet could be tethered in a position close to the vehicle, but outside thereof.

There is a need for a device which is readily portable, occupies little space, can be manufactured inexpensively and can be readily connected to the vehicular structure and which can be employed for the purpose of tethering the pet to a confined area either within the vehicle or exteriorly of the vehicle.

SUMMARY OF THE INVENTION

The structure of this invention is summarily described in the Abstract of the Disclosure and reference is to be had thereto.

The primary objective of this invention is to construct a simple, portable tethering device for a pet which can be manufactured inexpensively, readily carried and simply used, and also provides positive securement of the pet to a confined area.

BRIEF DESCRIPTION OF THE DRAWING

FIG. 1 is an isometric view showing the operation of the structure of this invention;

FIG. 2 is an isometric view of just the tethering device of this invention showing it not connected to a door and not connected to a pet;

FIG. 3 is an isometric view similar to FIG. 2 but of a first modified form of tethering device of this invention;

FIG. 4 is an isometric view similar to FIG. 2 but of a second modified form of this invention; and FIG. 5 is a view similar to FIG. 2 of a third modified form of tethering device of this invention.

DETAILED DESCRIPTION OF THE SHOWN EMBODIMENT

Referring particularly to the drawing, there is shown within FIG. 1 the inside of the vehicle which is represented generally as the vehicle seat 10 upon which is tethered an animal 12, such as a dog. The dog has a chain 14 located around its neck. The free end of the chain 14 is to be connected to a hook 16 conducted through an eyelet 18 formed as part of an attaching means between the member 20 and the chain 14.

In order to tether the pet 12, the operator only needs to fixedly locate the member 20 in an established position. An easy manner of fixing the locating of the member 20 would be to locate such between the door 22 and the rocker panel (door jam) 24 of the vehicle (not shown). The mere closing of the door 22 will therefore fixedly position the member 20. The member 20 can be located so that the pet 12 is confined to a particular area inside of the vehicle or can be reversed and then the animal 12 is confined to a prescribed area exteriorly of the vehicle.

The member 20 shown wthin FIGS. 1 and 2 is to be constructed entirely of leather. The tether 20 includes a center section 26 which is integrally connected between an outer enlarged end 28 and an inner enlarged end 30. The purpose of the inner enlarged end 30 is to provide increased thickness in the area of the eyelet 18 for the purpose of providing additional strength. The purpose of the enlarged end 28 is so as to prevent the pet 12 from removing the member 20 when it is located between the door 22 and the door jam 24. The thickness of the center section 26 is selected so as to not interfere with the operation of the door 22. A typical thickness would be approximately a quarter of an inch.

Referring particularly to FIG. 3 of the drawing, there is shown a first modified form of tether wherein like numerals are employed to refer to like parts. The distinction of the member of FIG. 3 as compared to the member of FIG. 2 is that the member of FIG. 3 is constructed as a single molded unit with the member 20' being smoothly contoured between the ends 28' and 30' forming a substantially thin center section 26'. It is envisioned that the member 20' will be constructed of a plastic or rubber material.

Referring particularly to FIG. 4 of the drawing, there is shown a second modified form of member 20". This member 20" will again employ like numerals to refer to like parts. The material of construction for the member 20" will normally comprise rubber and will be molded into a single unit. The ends 30' and 28' are constructed to be cylindrical and include respectively hollowed out sections 32 and 34. The center section 26" will normally be planar.

Referring particularly to FIG. 5, there is shown a third modification in the form of member 20'". Again, like numerals have been employed to refer to like parts. The structure of FIG. 5 is basically similar to FIG. 4 and includes the hollowed out sections 32' and 34'. The primary distinction of the structure of FIG. 5 with respect to FIG. 4 is that the sides of the center section 26'" are concavely formed. The purpose of this is to facilitate grasping by the operator to facilitate carrying of the tether and also to facilitate installing of the tether.

What is claimed is:

1. In combination with a vehicle, said vehicle having a body within which is located an openable door, a pet tether connectable with said vehicle, said pet tether comprising:

an elongated, thin, integral, flexible member having an outer end and an inner end connected together by a middle section, said middle section being sufficiently thin to be locatable between said openable door and said body with said openable door closed and not hinder the opening and closing movement of said openable door, removal of said member from said openable door to occur upon opening of said openable door, said outer end having a substantially greater thickness than said middle section, whereby said outer end prevents disassociation of said member from said openable door when said openable door is closed;

an attaching opening formed within said inner end, said inner end being substantially thicker than said middle section, the thickness of said inner end being for the purpose of providing extra strength about said attaching opening; and attaching means connected to said attaching opening, said attaching means for connecting to a pet to restrict the movement of the pet defined by the length of said attaching means.

2. The pet tether as defined in claim 1 wherein: said attaching means comprises a leash which is removably connectable to said attaching opening.

3. The pet tether as defined in claim 2 wherein: said member takes the form of a leather strap.

4. The pet tether as defined in claim 2 wherein: said member being constructed of molded rubber.

* * * * *